United States Patent [19]

Ljung

[11] Patent Number: 4,570,213
[45] Date of Patent: Feb. 11, 1986

[54] STATIC CONVERTER SWITCH WITH FAST RECOVERY FREEWHEEL DIODE

[75] Inventor: Erik A. Ljung, Stockholm, Sweden

[73] Assignee: Institut Cerac S.A., Ecublens, Switzerland

[21] Appl. No.: 627,694

[22] Filed: Jul. 3, 1984

[30] Foreign Application Priority Data

Jul. 5, 1983 [CH] Switzerland ............... 3680/83

[51] Int. Cl.⁴ ............................................. H02M 7/515
[52] U.S. Cl. ................................... 363/138; 307/253; 363/97
[58] Field of Search ................... 363/97, 98, 132, 138, 363/26, 41; 323/289; 307/253, 280, 300, 319

[56] References Cited

U.S. PATENT DOCUMENTS

| | | | |
|---|---|---|---|
| 4,245,288 | 1/1981 | McLyman | 363/26 |
| 4,346,309 | 8/1982 | Garrett et al. | 363/138 |
| 4,358,820 | 11/1982 | Lipman | 363/138 |
| 4,376,296 | 3/1983 | Bhagwat et al. | 363/138 |
| 4,405,977 | 9/1983 | Bhagwat et al. | 363/138 |
| 4,414,479 | 11/1983 | Foley | 307/253 |

Primary Examiner—Patrick R. Salce
Assistant Examiner—D. L. Rebsch
Attorney, Agent, or Firm—Sughrue, Mion, Zinn, Macpeak and Seas

[57] ABSTRACT

A static converter, including at least one pair of mutually co-acting switching transistors (TR1, TR2), of which the first switching transistor (TR1) is controlled with a frequency exceeding the control frequency of the second switching transistor (TR2). A diode (D1, D2) is connected between the emitter and collector of respective switching transistors. The noval feature of the invention resides in that a voltage source (N1, P) is activated when the first switching transistor (TR1) is energized to its conducting mode ($I_R$) and to supply a reverse recovery current ($I_{rr}$) through the diode (D2) of the second switching transistor in the reverse direction of the diode.

4 Claims, 13 Drawing Figures

STATIC CONVERTER SWITCH WITH FAST RECOVERY FREEWHEEL DIODE

The invention relates to an arrangement in a static converter, including at least one pair of mutually co-acting switching transistors, of which the first switching transistor is arranged to be controlled with a frequency exceeding the control frequency for the other switching transistor, and in which converter a diode is connected between the emitters and collectors of respective transistors.

An arrangement of this kind is often used for switching high power outputs when loading inductively, and such an arrangement will be discussed more clearly hereinafter. The problem which arises, and which is solved, or at least greatly reduced, by means of the invention concerns the high losses which occur because one of the switching transistors in said transistor pair is pulse-width modulated with a frequency of, for example, 1–8 kHz, while the other transistor of said transistor pair is controlled with a much lower frequency, for example a frequency of 50-60 Hz. This means that the first switching transistor is repeatedly switched on and off while the other transistor is in a non-conducting state or mode. The problem of losses created hereby, which problem will be discussed in more detail hereinafter, is solved in accordance with the invention, by arranging for a voltage source to be activated when the first switching transistor is in its conducting mode, and to feed a reverse recovery current through the diode of said second switching transistor in the reverse direction of said diode.

The known prior art and the present invention will be described in more detail with reference to the accompanying drawings, in which FIG. 1 illustrates the principal construction and operational mode of a so-called Darlington circuit;

Although it has been assumed that each pair of transistors and associated diodes are incorporated in a monolithic structure, it will be understood that discrete components can also be used.

Figure 1:
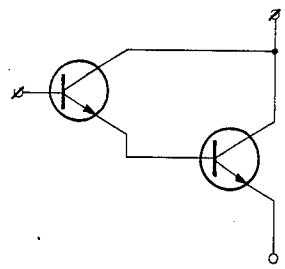

The so-called Darlington circuit is well known for switching high power outputs. The principal construction and operating mode of such a circuit is illustrated in FIG. 1, and is characterized by high current amplification, because the effective current-amplification factor, calculated from the base of the transistor T1 to the collector of the transistor T2 is equal to the product of the current-amplification factors of both transistors. In its most usual form, a Darlington circuit comprises a monolithic transistor, i.e. a transistor in which all components are formed on one and the same silicon plate.

Figure 2:
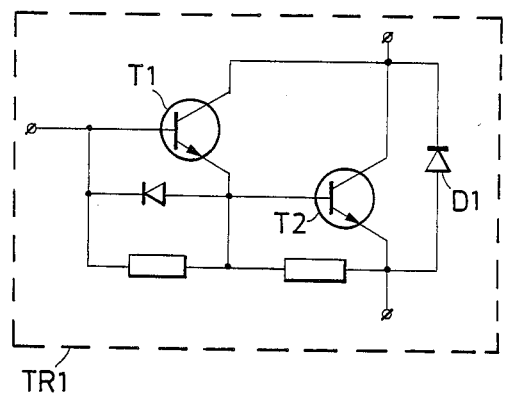
FIG. 2 illustrates an equivalent circuit for a Darlington circuit of monolithic construction.
Figure 3:
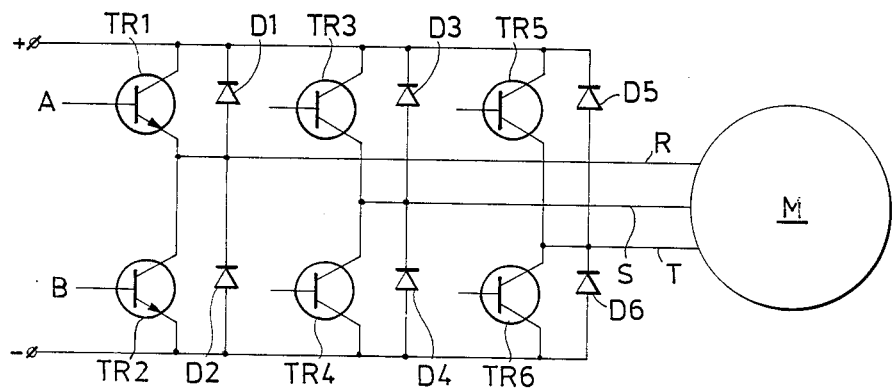
FIG. 3 illustrates a simplified static converter which has three pairs of switching transistors for operating a three-phase motor with an arbitrarily selected frequency.
Figure 4:
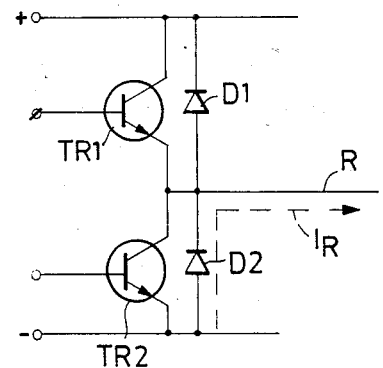
FIG. 4 illustrates a pair of switching transistors in the circuit shown in FIG. 3.
Figure 5:
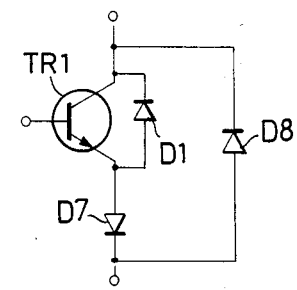
FIG. 5 illustrates a known circuit for eliminating the problem of short-circuiting.

An equivalent transistor circuit is illustrated in FIG. 2, and it will be seen from the Figure that there is formed in the monolithic structure a parasite diode $D_1$. Although this parasite diode is able to conduct the same current as the transistor, it has a relatively long reverse recovery time $t_{rr}$, in the order of 1–10 $\mu$s, with respect to switching. The advantage with the parasite diode is that it can be used as a so-called free-wheel diode. A free-wheel diode is required when the Darlington transistor is used for switching the current to an inductive load. In order to function under these circumstances without serious losses occurring and without the provision of a current-limiting net, the modulation technique must be such that a transistor is without voltage when it is energized to its conductive mode, i.e. a Darlington transistor must be without voltage when it is energized, which limits the usefulness of the transistor. A well known modulation technique is pulse-width modulation (PWM), which requires the transistor to be energized to conductive mode with a full voltage between collector and emitter, which means, for example, that the free-wheel diode D2 will conduct when the Darlington transistor TR1 shown in FIG. 3 is energized and brought to the conducting mode. FIG. 3 illustrates an a.c. rectifying bridge having Darlington transistors TR1-D1, TR2-D2, TR3-D3, TR4-D4, TR5-D5, and TR6-D6, each equivalent to the circuit illustrated in FIG. 2. In accordance with known techniques, the base electrodes of the transistors are supplied with control signals which determine the frequency of the alternating voltage. In the illustrated case a control voltage of high frequency is supplied to the input A to the first transistor TR1, TR3 and TR5 respectively, while a low frequency control voltage is supplied to the second transistor TR2, TR4 and TR6 respectively in each pair TR1, TR2 and TR3 respectively, i.e. the first transistor of each transistor pair will be switched on and off a number of times during the time when the second transistor of each transistor pair is throttled. The a.c. rectifying bridge supplies a three-phase motor M via phase conductors R, S and T. The limitation of the Darlington transistor resides in the fact that the free-wheel diode, as before mentioned, has a relatively long reverse recovery time, which results in excess current in the first transistor when energized. The problem of overcurrent, or excess current, occurs in the following manner. If one considers FIG. 4, which illustrates a part circuit of the a.c. rectifying bridge illustrated in FIG. 3, and if it is assumed that the motor current $I_R$ passes for the moment through the free-wheel diode D2, it will be found that when the Darlington transistor TR1 begins to conduct current, and thus take over the motor current $I_R$, D2 will not be blocked until the reverse recovery time $t_{rr}$ has lapsed, for the aforementioned reason. During this period of time, the diode D2 will conduct current in the reverse direction (reverse recovery current) and in principal a short circuit occurs via TR1 and D2 and a large current will flow in this short circuiting circuit. Various attempts have been made to eliminate this disadvantage. One such attempted solution has been to connect an external series diode D7 and a rapid free-wheel diode D8, as illustrated in FIG. 5, in order to isolate the parasite diode, for example the parasite diode D1.

Figure 6:
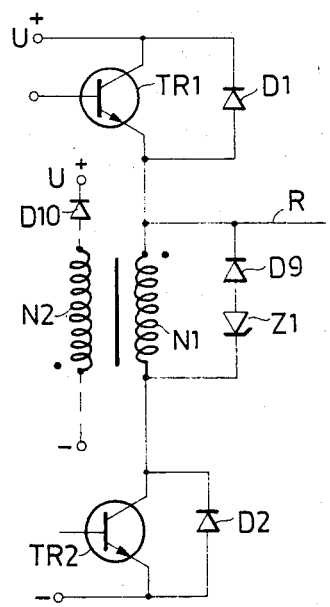
FIG. 6 illustrates another known circuit.

Another known solution is to limit the current growth in the circuit with the aid of inductances, so that the current peak occurring when the circuit is energized has reached a controlled and acceptable level when co-acting free-wheel diode is extinguished. Such a circuit is illustrated in FIG. 6. In this circuit, there is connected between the emitter of the transistor TR1 and the collector of the transistor TR2 a ferrite core which is wound with winding N1 and inductance L. Connected across the winding N1 is a zener diode Z1 and a diode D9. The circuit D9-Z1 empties the inductance of the energy stored during the conducting period. As will be seen from the following, relatively large losses are obtained in this circuit. Another known method of emptying the inductance and reducing losses is to arrange a winding N2 in series with a diode D10, as indicated in FIG. 6. A circuit D9-Z1 will still be required, however, due to the leakage inductance between the windings, with resultant losses.

When the transistor TR2 conducts current, the current passes through the inductance. The inductance is emptied of energy after each conducting period, and the losses in the net D9-Z1 are;

$$P = L \cdot \bar{I}^2 \cdot f/2$$

where
$\bar{I}$ = mean current in the inductance
$f$ = transistor control frequency.
With
$\bar{I} = 15A$
$L = 60 \mu H$
$f = 3000 Hz$
there is obtained P = 20 W, which requires large passive components in order to restrict temperature rises.

Figure 7:
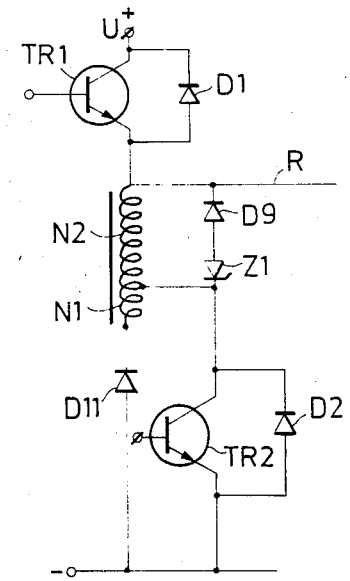
FIG. 7 illustrates a circuit according to the invention which has a voltage source for providing a reverse recovery current for the diode of the second switching transistor.

The disadvantages with the known circuits for eliminating or reducing the harmful reverse recovery current of the free-wheel diode-parasite diode can be eliminated in accordance with the invention by supplying the free-wheel diode with a reverse recovery current from a separate current source. As will be made apparent hereinafter, such current supply can be effected with simple means. In accordance with the invention, the current load on the transistor which is energized is greatly reduced and because the occurring current peak and its derivative can be increased there is obtained a reverse recovery time of shorter duration in respect of the free-wheel diode in the monolithic structure of the Darlington transistor, enabling the use of magnetic components which are smaller, and thus less expensive, than the components used in an arrangement according to FIG. 6. This is because it is a given charge which is to be emptied from the free-wheel diode. It is true that the charge increases with the current derivative, although not more than an increase of the derivative from 4 to 75 A/µs results in at least a halving of the reverse recovery time $t_{rr}$. A preferred embodiment of a circuit according to the invention is illustrated in FIG. 7. This circuit differs from the known circuit illustrated in FIG. 6 in that the inductance for limiting current growth is replaced with a transformer, which is coupled between the collector and emitter of the transistor TR2, across one, or optionally more, series-connected diodes D11, enabling a feedback current (reverse recovery current $I_{rr}$) to be conducted. The transformer winding N1 forms the aforementioned separate voltage source.

The functional mode of the circuit according to the invention is described with reference to FIGS. 8, 9, 10 and 11.

Figure 8:
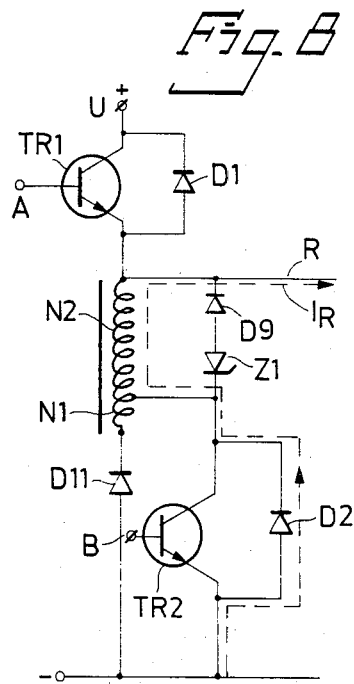
FIG. 8 illustrates the phase current when the first transistor in the circuit shown in FIG. 7 is brought to a non-conducting state or mode.
Figure 9:
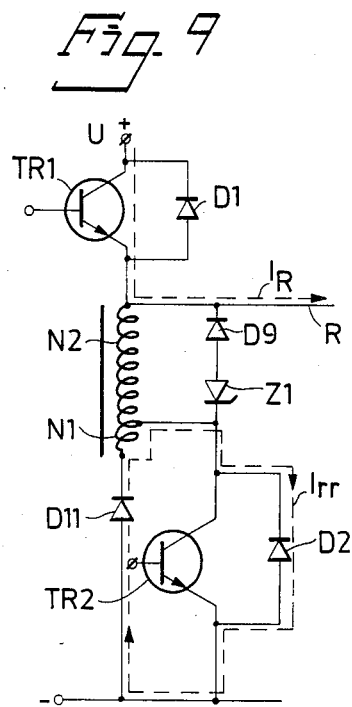
FIG. 9 illustrates the passage of the reverse recovery current through the diode of the second transistor when the first transistor has begun to conduct current during a subsequent control pulse.

FIGS. 8 and 9 illustrate commutation from D2 to TR1. It is first assumed that the current $I_R$ flows through the free-wheel diode D2 to the line R, which constitutes one of the three phases of the motor M. When the transistor TR1 is energized to its conducting mode, the voltage across the free-wheel diode D2 of the transistor TR2 is only some volts and the whole of the supply voltage U lies across the winding N2. Since N1 and N2 are transformer-coupled, the voltage U·N1/N2 will lie across the winding N1 and its polarity is such that the voltage on diode D2 is reversed and the major part (N2/N2+N1) of the reverse recovery current $I_{rr}$ will thus flow in the circuit D11-N1-D2. This assumes that the transformer is not saturated during the reverse recovery time $t_{rr}$ of the diode D2.

From the equation $U = N \cdot d\phi/dt$ there is obtained the smallest area for the ferrite core for avoiding saturation during the reverse recovery time;

$$A \geq U \cdot t_{rr}/(\hat{B} \cdot N2)$$

A = cross-sectional area of the ferrite core
$t_{rr}$ = reverse recovery time of the diode
$\hat{B}$ = flux density upon saturation of the ferrite core
with some typical values of the parameters there is obtained*

$$A \geq 300 \cdot 1.5 \cdot 10^{-6}/(0.4 \cdot 25) = 45 \times 10^{-6} m^2$$

This core may, for example, be a standard toroid core having a diameter of about 25 mm and a winding ratio N2 = 25N1 = 2. With a transistor of the type MJ 10016, this will provide a recovery current $I_{rr} \approx 60$ Ampere, of which only 5 Ampere will pass through transistor TR1. No current is passed in the net D9-Z1, and thus no losses occur in said net during this phase.

Figure 10:
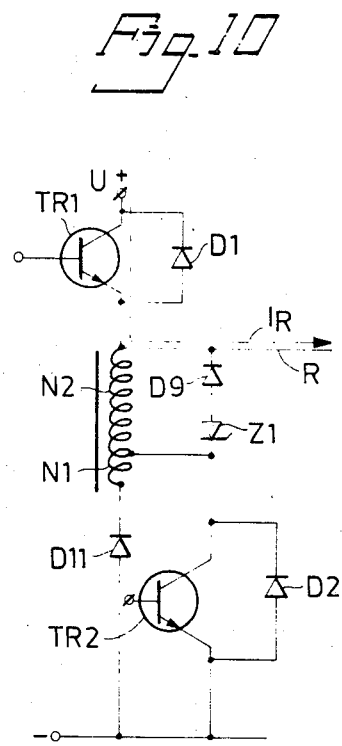
FIG. 10 illustrates the state of the circuit when the reverse recovery current ceases.
Figure 11:
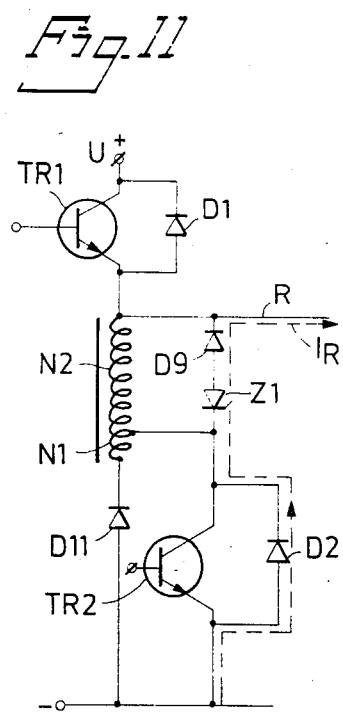
FIG. 11 illustrates the state of the circuit when the control pulse to the first switching transistor has ceased and commutation of the phase current takes place to the second switching diode.

FIGS. 10 and 11 illustrate commutation from TR1 to D2. It is assumed that the phase current $I_R$ flows from TR1 to the motor phase R, the lower part of the circuit illustrated in FIG. 10 being without current. When TR1 is throttled, the current $I_R$ will commute to the free-wheel diode D2 (FIG. 11). Because of the inductance in the transformer winding N2, the current is forced to pass to the phase conductor R through the circuit Z1-D9. The voltage across this circuit Z1-D9 means that the transformer is saturated after a time period of $$t_m = A \cdot \hat{B} \cdot n2/(U_{Z1}32\ U_{D5})$$

where
A = cross-sectional area of the ferrite core (m²)

B = flux density upon saturation of the ferrite core (V·s/m²)

n2 = the number of winding turns of the winding N2

$U_{Z1}$ = the voltage drop in volts across Z1 (V)

$U_{D9}$ = the voltage drop in volts across D9 (V)

Figure 12:
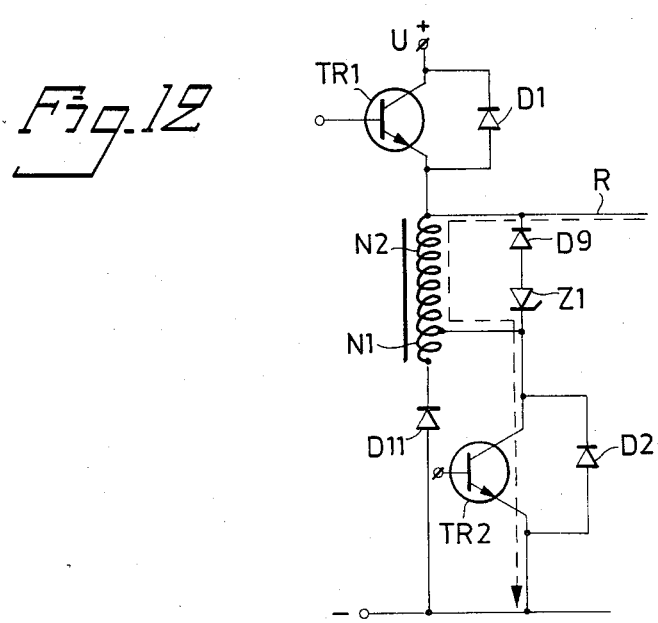
FIG. 12 illustrates the state of the circuit immediately prior to the second switching transistor being switched off.

When the ferrite core is saturated, the phase current will flow via the coil or winding N2. During the saturation time $T_m$ there is obtained a power loss in the circuit Z1-D9, which with previously assumed values is about 7 watts. With previously assumed values, the saturation time $T_m$ is about 4μ. A further, small power loss is obtained at that moment when the transistor TR2 is blocked and thus becomes non-conducting. This power loss is illustrated in FIG. 12. The phase current $I_R$ then flows through the coil or winding N2 and through TR2 from the phase R. When the energy stored in the transformer is consumed in the circuit Z1-D9 is switched off, there is obtained a power loss which with the aforementioned toroid core and with other conditions unchanged will be less than 1 watt. Thus, the total power loss will be about 8 watts, which shall be compared with a power loss of 20 watts in an arrangement according to FIG. 6.

Figure 13:
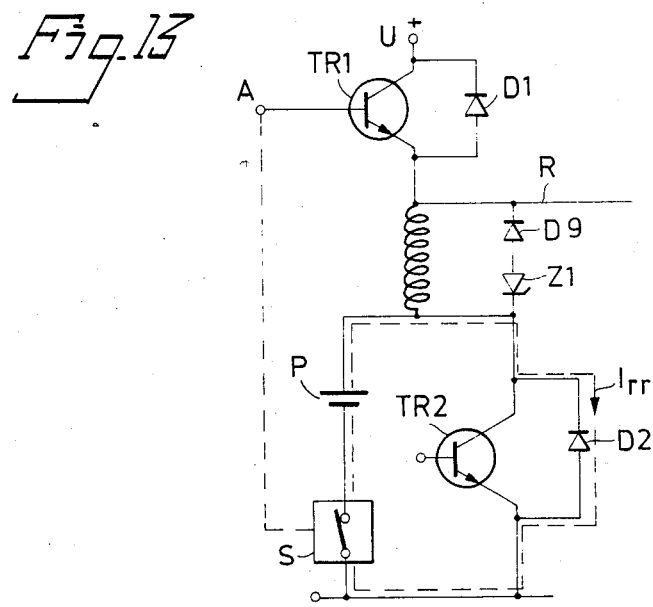
FIG. 13 illustrates a simplified arrangement according to the invention for producing a reverse recovery current for the diode of the second switching transistor.

FIG. 13 illustrates a simplified voltage source P in the form of a battery, which is coupled to D2 by means of a switch S and produces the reverse recovery current $I_{rr}$, in order to rapidly discharge D2, as described above. The switch S, which is shown in its closed position, may comprise, for example, a transistor or some other well known switch element, and the control is effective synchronously with the control of the first transistor TR1, and suitably the same control signal is supplied to the switch S as that supplied to the transistor TR1, as indicated in FIG. 13. Another possibility of producing the reverse recovery current through the diode D2 is to discharge a capaciter through said diode.

I claim:

1. An arrangement in a static converter, including at least one pair of mutually co-acting switching transistors (TR1, TR2), of which the first switching transistor (TR1) is arranged to be controlled with a frequency exceeding the control frequency of the second switching transistor (TR2), there being connected between the emitter and collector of respective switching transistors a diode (D1, D2), characterized by a voltage source (N1, P) arranged to be activated when the first switching transistor (TR1) conducts current, and to supply a reverse recovery current ($I_{rr}$) through the diode (D2) of said second switching transistor (TR2) in the reverse direction of said diode.

2. An arrangement according to claim 1, characterized in that the voltage source comprises a winding (N1) on a transformer (N1, N2) to which the supply voltage (U) of the switching transistor is supplied when the first switching transistor (TR1) is energized to its conducting mode; and in that the winding (N1) is arranged to reverse bias the diode (D2) of the second switching transistor (TR2).

3. An arrangement according to claim 1, characterized in that said voltage source (P) is arranged to be energized synchronously with the energization of the first switching transistor (TR1) to its conducting mode; and to reverse bias the diode (D2) of the second switching transistor.

4. An arrangement according to claim 2, characterized in that the transformer (N1, N2) has two windings connected in series with one another, of which one winding (N2) is connected between the emitter of the first switching transistor (TR1) and the collector of the second switching transistor (TR2), and the second winding (N1) is connected between the collector and emitter of the second switching transistor (TR2).

* * * * *